United States Patent [19]

Utsugi

[11] Patent Number: 4,910,610
[45] Date of Patent: Mar. 20, 1990

[54] FACSIMILE COMMUNICATION SYSTEM

[75] Inventor: Masayoshi Utsugi, Tokyo, Japan

[73] Assignee: Kokusai Denshin Denwa Co., Ltd., Tokyo, Japan

[21] Appl. No.: 246,721

[22] Filed: Sep. 20, 1988

[30] Foreign Application Priority Data

Sep. 21, 1987 [JP] Japan .................... 62-235020

[51] Int. Cl.⁴ .................... H04N 1/00; H04N 1/42
[52] U.S. Cl. .................... 358/435; 358/434; 379/100
[58] Field of Search ........ 358/256, 257, 400, 434–440; 375/13; 379/100

[56] References Cited

U.S. PATENT DOCUMENTS 4,606,044  8/1986  Kudo ........................ 375/13
4,630,126  12/1986  Kaku et al. ................ 358/257
4,734,780  3/1988  Iwata et al. ............... 375/13
4,736,249  4/1988  Iizuka et al. .............. 358/257

Primary Examiner—James J. Groody
Assistant Examiner—Tommy D. Lee
Attorney, Agent, or Firm—Armstrong, Nikaido, Marmelstein, Kubovcik & Murray

[57] ABSTRACT

Four channels of group 3 facsimile signal are transmitted through a digital transmission line of Bearer rate 64 Kbits/s for a speech signal. A facsimile signal is separated into a tone signal, a binary control signal, and a picture signal, each converted to digital form. Then, a block having 160 bits is assembled including 96 data bits and some control bits, and a justification bit. A justification bit matches clock rate of the present system with clock rate of an external digital transmission line by deleting or inserting one bit in a block. Thus, a conventional group 3 facsimile device is coupled with 16 Kbits/s digital transmission line with no design change for the facsimile device itself.

5 Claims, 3 Drawing Sheets

FACSIMILE COMMUNICATION SYSTEM

BACKGROUND OF THE INVENTION

The present invention relates to a facsimile communication system, in particular, relates to such a system in which the group 3 facsimile signal is transmitted through a digital transmission line by conversion of a tone signal, a binary signal and a picture signal to digital form.

Conventionally, a group 3 (G III) facsimile signal is transmitted through an analog telephone line with 4 KHz band, or a digital line with 64 Kbit/s rate using a CODEC which convert an analog facsimile signal to a digital PCM signal.

However, said digital transmission system using a PCM code has the disadvantage that it needs 64 Kbit/s of Bearer rate, although the G3 facsimile signal has only a slow data rate of up to 9600 bit/s. So, the efficiency of the transmission line is not being fully utilized.

SUMMARY OF THE INVENTION

It is an object, therefore, of the present invention to overcome the disadvantages and limitations of a prior facsimile communication system by providing a new and improved facsimile communication system.

It is also an object of the present invention to provide a facsimile communication system which transmits a facsimile signal through a digital transmission line utilizing a lower transmission rate, for instance 16 Kbit/s.

The above and other objects are attained by a facsimile communication system for transmitting facsimile signal including a tone signal, a binary signal and a picture signal comprising; a first terminal (24) coupled with a facsimile terminal; an analog circuit interface (10) coupled with said first terminal (24) for separating and/or combining said tone signal, said binary signal and said picture signal; a tone transmitter/receiver (12) coupled with said analog circuit interface (10) for converting said tone signal between analog tone signal and digital information; a first modem (14) coupled with said analog circuit interface (10) for modulating-/demodulating said binary signal; a second modem (16) coupled with said analog circuit interface (10) for modulating/demodulating said picture signal; a first modem control (18) for controlling said first modem (14); a second modem control (20) for controlling said second modem (16); a digital circuit interface (22) coupled with said tone transmitter/receiver (12), said first modem control A (18) and said second modem control B (20) for assembling signals from said members (12, 14, 16) into a digital block having a predetermined number of bits, and de-assembling the digital block for said members (12, 14, 16); and a second terminal (26) coupled with said digital circuit interface and an external digital transmission line.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The detailed specification of the Group 3 facsimile system is determined internationally by the CCITT International Consultative Committee for Telephone and Telegraph) recommendations T4 and T30.

The various abbreviations used in the specification and the corresponding functions thereof are set forth as follows:

CED—called station identification;
CFR—confirmation to receive;
CNG—calling tone;
DCS—digital command signal;
DIS—digital identification signal;
EOM—end of message;
MCF—message confirmation; and
TCF—training check.

The above abbreviations and the corresponding functions thereof are determined by the CCITT recommendations T30.

Figure 1:
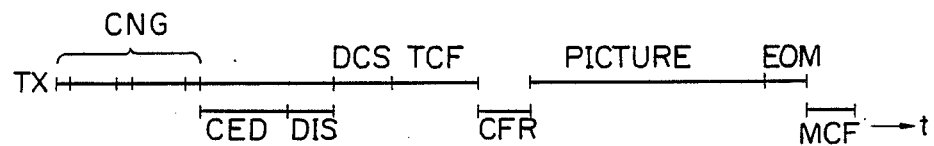
FIG. 1 shows the time sequence of each signal in G3 facsimile communication.

FIG. 1 shows the brief transmission procedure in the group 3 facsimile system. In the figure, the transmit side (TX) which intends to transmit a picture signal first sends a calling tone (CNG) to a receive side. The calling tone (CNG) is the repetition of the calling signal of 1100 ($\pm 38$) Hz for 0.5 second and 3 seconds of pause. The receive side which acknowledges the receipt of the calling tone (CNG) returns to the transmit side a called station identification (CED) and a digital identification signal (DIS). The called station identification (CED) is a continuous signal of 2100 ($\pm 15$) Hz for 2.6-4.0 second.

Next, the transmit side, upon receipt of CED and DIS, transmits a digital command signal (DCS) which defines the modem speed for a picture signal, line density of a picture, paper width, paper length, et al. The DCS signal is sent by modulating a carrier signal of 300 Hz.

Next, the transmit side transmits a training signal (TCF), which is the continuation of "0" data. The TCF is first sent in 9600 bps, and when a receive side recognizes that the rate is too high due to an error, the rate is decreased to 7200 bps, 4800 bps, and 2400 bps, in sequence. And, when the receive side recognizes that the communication is possible under the instant rate, the receive side returns the CFR which indicates acknowledgement that it is ready for reception. Then, the transmit side sends a picture signal.

The EOM which shows the end of the picture signal is sent showing the end of the picture to finish the facsimile communication. The receive side returns the MCF to indicate the successful message reception.

The transmission rate of a modem signal is in the range between 300 bps (bit per second) and 9600 bps. Therefore, when the facsimile signal is sent in a digital line, it must have the capability to transmit the facsimile signal of up to 9600 bps.

The present invention uses a digital transmission line of 16 Kbit/s for a group 3 facsimile signal. So, a conventional digital transmission line of 64 Kbit/s used for the transmission of a voice signal can send four multiplexed group 3 facsimile signals.

The table 1 shows the example of the transmission format of a digital signal according to the present invention.

TABLE 1

|  |  | Bit |  |  |  |  |  |  |  |
|---|---|---|---|---|---|---|---|---|---|
|  |  | 1 | 2 | 3 | 4 | 5 | 6 | 7 | 8 |
|  | 0 | 0 | 0 | 0 | 0 | 0 | 0 | 0 | 0 |
|  | 1 | 1 | D1 | D2 | D3 | D4 | D5 | D6 | S |
|  | 2 | 1 | D7 | D8 | D9 | D10 | D11 | D12 | X |
|  | 3 | 1 | D13 | D14 | D15 | D16 | D17 | D18 | S |
|  | 4 | 1 | D19 | D20 | D21 | D22 | D23 | D24 | S |
|  | 5 | 1 | E1 | E2 | E3 | E4 | E5 | E6 | E7 |
|  | 6 | 1 | D25 | D26 | D27 | D28 | D29 | D30 | S |
|  | 7 | 1 | D31 | D32 | D33 | D34 | D35 | D36 | X |
|  | 8 | 1 | D37 | D38 | D39 | D40 | D41 | D42 | S |
| Word | 9 | 1 | D43 | D44 | D45 | D46 | D47 | D48 | S |
|  | 10 | 1 | D49 | D50 | D51 | D52 | D53 | D54 | S |
|  | 11 | 1 | D55 | D56 | D57 | D58 | D59 | D60 | X |
|  | 12 | 1 | D61 | D62 | D63 | D64 | D65 | D66 | S |
|  | 13 | 1 | D67 | D68 | D69 | D70 | D71 | D72 | S |
|  | 14 | 1 | E8 | E9 | E10 | E11 | E12 | E13 | E14 |
|  | 15 | 1 | D73 | D74 | D75 | D76 | D77 | D78 | S |
|  | 16 | 1 | D79 | D80 | D81 | D82 | D83 | D84 | X |
|  | 17 | 1 | D85 | D86 | D87 | D88 | D89 | D90 | S |
|  | 18 | 1 | D91 | D92 | D93 | D94 | D95 | D96 | S |
|  | 19 | 1 | E15 | E16 | E17 | E18 | E19 | E20 | P |

In the table 1, the block has 160 bits with 20 words each having 8 bits. So, when 16 Kbit/s digital line is used, 100 blocks are transmitted in a second.

The first word (word 0) has eight 0 bits (00000000), and the first bit of the words 1-19 is 1. Those 27 bits (8 bits of 0, and 19 bits of 1) function as synchronization bits for the synchronization of the block, and/or each word.

The bits D1 through D96 are used for transmitting a modem signal data (picture signal). Since 100 blocks are sent in a second, there exist 9600 bits (96×100) for data bits, and that figure is enough for 9600 bps facsimile signal.

The bits E1, E2, E3 and E4 show the modem speed information, and correspond as follows.

0000=no modem signal exists
0010=300 bit/s (binary signal)
1100=2400 bit/s (facsimile signal)
0100=4800 bit/s (facsimile signal)
1010=7200 bit/s (facsimile signal)
0110=9600 bit/s (facsimile signal)

The bit E5 is used for a calling tone (CNG). When E5=1, the CNG signal exists, and when E5=0, no CNG signal exists.

The bit E6 is used for a called station identification (CED). When CED=1, the CED signal exists, and when E6=0, no CED signal exists.

The bits E11 and E12 are justification control bits. When E11 and E12 are 00, no justification bit P (word 19, bit 8) is transmitted. When E11 and E12 are 01, one bit of justification bit (P=0) is transmitted. When E11 and E12 are 10, two bits of justification bits (P=00) are transmitted.

The bit P is a justification bit, and the content of the same is determined by said bits E11 and E12.

The justification bit P functions to match the modem speed of the present apparatus with the clock rate of an external digital transmission line. Since the bit P is null (E11 and E12 are 00), P=0 (one bit), or P=00 (two bits), the total bits of the block is 159 bits, or 160 bits, or 161 bits. Thus, speed matching is effected by deleting or inserting one justification bit in each block.

Other bits (E7 through E10, E13 through E20, S and X) are not used, and are idle.

The presence of the justification bit P in a block is a feature of the present invention. Due to the presence of the justification bit, any conventional group 3 facsimile apparatus may be coupled with a conventional digital transmission line through the present apparatus.

Figure 2:
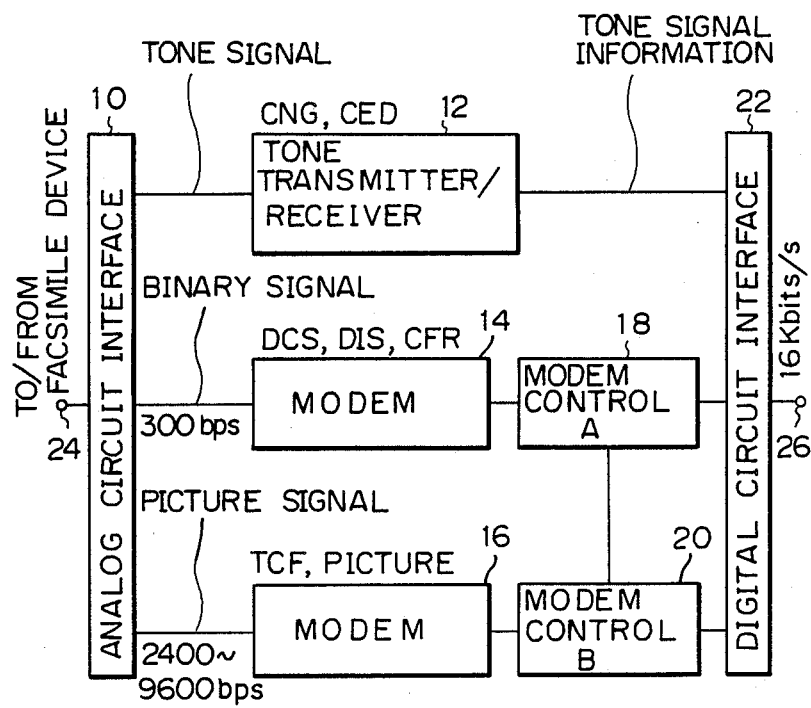
FIG. 2 is a block diagram of the facsimile communication system according to the present invention.

FIG. 2 shows a block diagram of the facsimile communication system according to the present invention, in which the numeral 10 shows an analog circuit interface which is coupled with a facsimile device through an input/output terminal 24 and an analog transmission line connected to said terminal 24. The analog circuit interface 10 functions the interface of the analog facsimile signal with the present apparatus. In a transmit mode, the analog circuit interface 10 separates the analog facsimile signal into a tone signal (CNG), a binary signal (DCS), and a facsimile picture signal (and a training signal TCF). In a receive mode, the analog circuit interface 10 combines the tone signal (CED), the binary signal (DIS, CFR) and the facsimile picture signal into an analog facsimile signal.

The numeral 12 is a tone transmitter/receiver which functions to convert a calling tone (CNG) in analog form from the analog circuit interface 10 to the calling signal information in digital form which is applied to the digital circuit interface 22 in transmit mode, and converts the calling signal (CNG) information in digital form from the digital circuit interface 22 to the calling tone in analog form to the analog circuit interface 10. The calling tone (CNG) is the combination of 1100 Hz(±38Hz) with 0.5 second and pause of 3 seconds.

The numeral 14 is a binary signal modem which is a modem of data signal rate 300 bit/s of CCITT recommendation V.21 (channel 2), and operates under the control by the first modem control A 18.

The numeral 16 is a facsimile signal modem which satisfies the CCITT recommendation V.27 ter, and/or V.29, and operates under the control by the second modem control B 20.

The numeral 18 is a first modem control A which functions;
 (a) to transmit/receive modem signal in digital form to/from the digital circuit interface 22, and to control the binary signal modem 14, and
 (b) to derive modem rate data from a facsimile information field of the digital command signal (DCS), and forward the same to the modem control B 20.

The numeral 20 is a second modem control B which functions;
 (a) to transmit/receive modem signal in digital form to/from the digital circuit interface 22, and to control the facsimile signal modem 16, and
 (b) to determine the operational speed of the modem according to the modem rate information from the modem control A 18, or the training signal, or the modem speed information from the digital circuit interface 22.

The numeral 22 is a digital circuit interface which functions;
 (a) to interface the digital external circuit with the present device,
 (b) convert the signal to the format (table 1) requested in the external digital circuit, and
 (c) to transmit/receive signals to/from the tone signal transmitter/receiver 12, the binary signal modem 14, and the facsimile signal modem 16.

The group 3 facsimile system switches the binary signal carrier and the facsimile picture signal carrier. So, the carrier control of each modem must be effected in a receive side so that the carrier signal for a binary signal and the carrier signal for a picture signal (and a training signal TCF) are switched, so that no carrier signal is sent to a facsimile terminal when no binary signal (or picture signal) exists.

The end of the binary signal is detected by detecting the flag, which may be used for switching the carrier signals.

The end of the facsimile picture signal is detected by the return control (RTC), which may be used for switching the carrier signals.

As for a training check signal TCF which is continuous signal of "0", no discriminator exists in the signal itself. So, the end of the TCF signal by using the signal itself is impossible, and therefore, the particular control for the carrier control must be considered.

Figure 3:
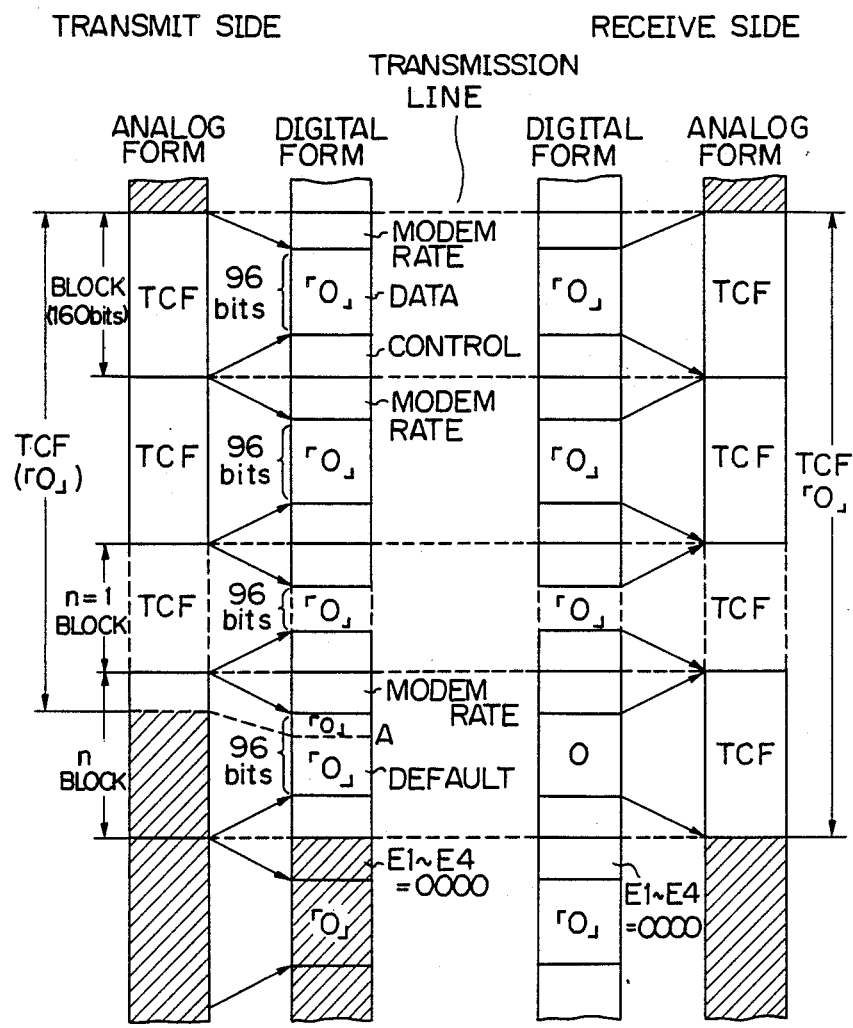
FIG. 3 shows the control of transmission and reception of a TCF signal.

FIG. 3 shows the embodiment of the transmit/receive control of the TCF signal according to the present invention.

The TCF signal is the "0" signal by the facsimile picture signal for the duration of 1.5(±10%) second.

In FIG. 3, it is assumed that the TCF signal occupies the blocks 1 through n-1, and the first part of the block n. The first block 1 having 160 bits with 96 bits of "0" (TCF signal) with the modem rate signal (E1 through E4) and other control bits is sent to a receive side, which demodulates the TCF signal. Similarly, the TCF signal is sent until (n-1)th block. In the block n, the TCF signal stops at A during the block n. In that case the transmit side sends the default value "0" in the bits D1 through D96 as if the TCF signal continues until the end of the block n, and the receive side receives the block n as the TCF signal. Therefore, the length of the TCF signal in the receive side is a little longer than of the transmit side. That prolongation of the TCF signal is of little or no concern in a practical facsimile communication.

The block n+1 after the TCF signal is sent with the control bits E1 through E4 to be 0000, which the receive side recognizes that the block n+1 has no effective signal.

As a modification, the actual bit length of a TCF signal in a block is coded by using the idle bits, which are transferred to a receive side to recognize the end of the TCF signal.

Figure 4:
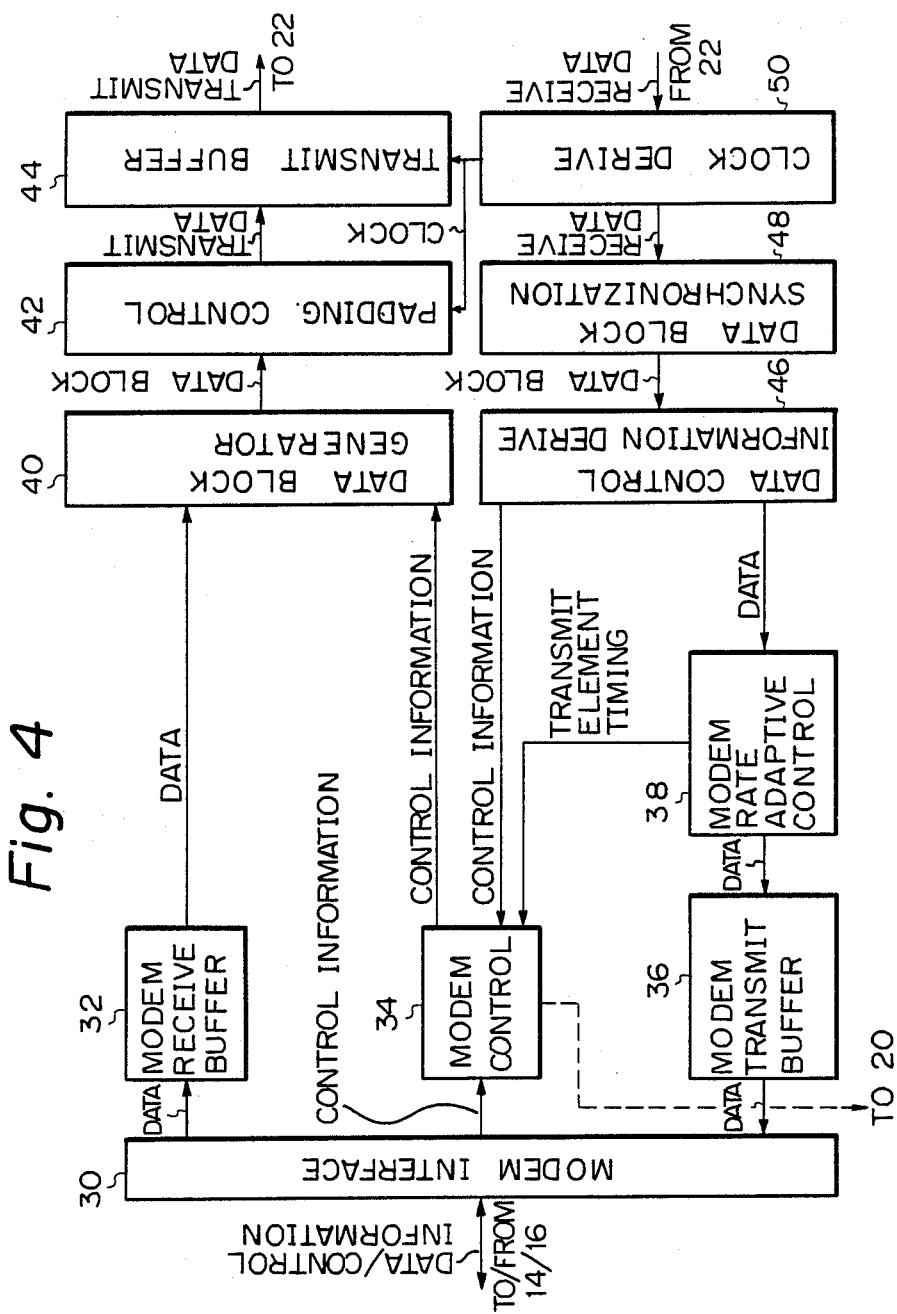
FIG. 4 is a block diagram of a modem control according to the present invention.

FIG. 4 shows a block diagram of the modem controls 18 and 20.

In the figure, the numeral 30 is a modem interface coupled with a modem 14 or 16 for physical covnversion of data and control information.

The numeral 32 is a modem receive buffer coupled with said modem interface 30 for storing temporarily data from the modem.

The numeral 34 is a modem control coupled with said modem interface 30. The modem control 34 receives and sends information relating to switch carriers and timing, from and to the modem. The modem control 34 also controls the carrier signal of the modem, that is to say, the modem control 34 tests the carrier detection information from the modem through the modem interface, and when the carrier signal is broken, it sets the modem rate information ($E_1E_2E_3E_4$) to be no modem signal (0000), which is sent to the data block generator 40. Further, the modem control 34 tests the modem rate signal from the data/control information derive 46, and when no modem signal exists ($E_1E_2E_3E_4$=0000), it has the modem break the carrier signal through the modem interface 30.

When it is used in the modem control A 18, the modem control 34 forwards the modem rate information, which is received by the modem control 34 in the other apparatus B 20.

The numeral 40 is a data block generator for assembling data block as shown in the table 1 according to the data and the control information from the modem receive buffer 32.

The numeral 42 is a padding control for justification. It compares the data rate from the data block generator 40 with the clock rate from the clock derive 50, and inserts or deletes one padding bit in each block which has 160 bits. The allowable error of the data speed in a modem is ±0.01% in the CCITT recommendation. The insertion or deletion of one bit in a block (160 bits) can adjust an error up to 0.625% (=1/160). Therefore, the insertion or deletion of one bit in every 60 blocks is enough for satisfying said allowable error of 0.01%.

The numeral 44 is a transmit buffer coupled with said padding control 42, for storing data temporarily before the data is sent to an external line. The transmission of data is synchronized with the clock signal from the clock derive 50. The transmit buffer 44 also converts the data physically so that the signal of the modem control matches with the digital circuit interface.

The numeral 50 is a clock derive coupled with the digital circuit interface 22 in FIG. 2 for deriving a clock signal from receive data from the digital circuit interface 22 and for supplying derived clock signal to the padding control 42 and the transmit buffer 44. The clock derive also effects the physical conversion of the signal so that the signal from the digital signal interface matches with the modem control.

The numeral 48 is a data block synchronization which effects the synchronization of a data block (having 160 bits) according to the synchronization bits in a block. It also effects the insertion or deletion of a padding bit in a receive data block according to the padding information (justification bit) in a data block.

The numeral 46 is a data/control information derive coupled with the data block synchronization 48. It separates data and control information in a received data block. The data is forwarded to the modem rate adaptive control 38, and the control information is forwarded to the modem control 34.

The numeral 38 is a modem rate adaptive control coupled with said data/control information derive 46. It effects to match the data rate of the modem with the data rate of the far end terminal. The data rate is independent from that of the transmission line, but depends merely upon the data speed of the far end terminal.

The adjustment of the data speed is effected by the timing control of data elements. For instance, the interval of data elements from the data/control information derive 46 is measured to provide the data speed and generate the timing signal for transmit data elements, which are sent to the modem. Alternatively, a buffer storage is provided to store the data temporarily, and when the queue in the buffer exceeds the predetermined value, the speed of the data transmission is increased, and when the que becomes shorter than the predetermined lower value, the data speed is decreased.

The numeral 36 is a modem transmit buffer coupled with said modem rate adaptive control 38. It stores data temporarily.

The present invention has the advantage that a digital transmission line of the Bearer rate 64 Kbits/s for a speech signal may transmit a plurality of facsimile signals. In the above embodiment, four facsimile signals may be multiplexed on a single 64 Kbits/s digital transmission line, while that digital line can transmit only one facsimile signal in a prior art. So, the present invention improves the efficiency of a digital transmission line.

From the foregoing, it will now be apparent that a new and improved facsimile communication system has been found. It should be understood, of course, that the embodiments disclosed are merely illustrative and are not intended to limit the scope of the invention. Reference should be made to the appended claims, therefore, rather than the specification as indicating the scope of the invention.

What is claimed is:

1. A facsimile communication system for transmitting facsimile signal including a tone signal, a binary signal and a picture signal comprising;
   a first terminal (24) coupled with a facsimile terminal,
   an analog circuit interface (10) coupled with said first terminal (24) for separating and/or combining said tone signal, said binary signal and said picture signal,
   a tone transmitter/receiver (12) coupled with said analog circuit interface (10) for converting said tone signal between analog tone signal and digital information,
   a first modem (14) coupled with said analog circuit interface (10) for modulating/demodulating said binary signal,
   a second modem (16) coupled with said analog circuit interface (10) for modulating/demodulating said picture signal,
   a first modem control (18) for controlling said first modem (14),
   a second modem control (20) for controlling said second modem (16),
   a digital circuit interface (22) coupled with said tone transmitter/receiver (12), said first modem control (18) and said second modem control (20) for assembling signals into a digital block having a predetermined number of bits, and de-assembling the digital block, and
   a second terminal (26) coupled with said digital circuit interface and an external digital transmission line.

2. A facsimile communication system according to claim 1, wherein said digital block has 160 bits including 96 bits for a picture signal, 4 bits for showing transmission rate, two bits for showing tone signals, one justification bit, and two bits for controlling the justification bit, said digital transmission line being a 16 Kbit/s digital transmission line.

3. A facsimile communication system according to claim 1, wherein the number of bits in a block is at least one of 159, 160 and 161 depending upon a justification bit, which matches clock rate of the present system with that of an external digital transmission line.

4. A facsimile communication system according to claim 1, wherein a block sending a training signal TCF is filled with a default value "0" when said TCF signal stops during the block.

5. A facsimile communication system according to claim 1, wherein said modem controls match data rate of said modems to a rate of data received from said digital circuit interface by timing control of data elements.

* * * * *